US008704646B2

(12) United States Patent
Beach et al.

(10) Patent No.: US 8,704,646 B2

(45) Date of Patent: Apr. 22, 2014

(54) ALARM PANEL PHONE NUMBER CAPTURE AND SUBSTITUTION

(75) Inventors: Chris Beach, West Islip, NY (US); Jim Chermak, E. Northport, NY (US); Mark H. Schmidt, West Islip, NY (US); John Brandstetter, West Islip, NY (US)

(73) Assignee: Honeywell International Inc., Morristown, NJ (US)

( * ) Notice: Subject to any disclaimer, the term of this patent is extended or adjusted under 35 U.S.C. 154(b) by 544 days.

(21) Appl. No.: 12/633,974

(22) Filed: Dec. 9, 2009

(65) Prior Publication Data

US 2011/0133909 A1 Jun. 9, 2011

(51) Int. Cl.

*G07C 11/00* (2006.01)
*G08B 5/36* (2006.01)
*G08B 1/08* (2006.01)
*G05B 23/02* (2006.01)
*H04M 3/42* (2006.01)

(52) U.S. Cl.

USPC ............ 340/286.06; 340/539.16; 340/286.11; 340/3.1; 379/211.02

(58) Field of Classification Search

USPC ..................................................... 340/286.06

See application file for complete search history.

(56) References Cited

U.S. PATENT DOCUMENTS 5,029,196 A * 7/1991 Morganstein .............. 379/88.23
5,233,640 A * 8/1993 Kostusiak ........................ 379/39
5,323,444 A * 6/1994 Ertz et al. ......................... 379/45
5,424,708 A * 6/1995 Ballesty et al. .......... 340/286.02
5,454,024 A * 9/1995 Lebowitz ........................ 379/40
5,517,547 A 5/1996 Ladha et al.
5,862,201 A * 1/1999 Sands ........................ 379/27.06
5,943,394 A 8/1999 Ader et al.
6,125,126 A * 9/2000 Hallenst.ang.l ............... 370/522
6,366,647 B1 * 4/2002 Webb .............................. 379/40
6,608,895 B1 8/2003 Avidan
6,831,557 B1 * 12/2004 Hess ........................ 340/539.16
7,825,796 B1 * 11/2010 Simon ...................... 340/539.17
7,864,672 B1 * 1/2011 DeCaluwe et al. ........... 370/229
8,171,136 B2 * 5/2012 Petite ............................ 709/224
8,265,605 B2 * 9/2012 Marett et al. ............... 455/414.1
2007/0121923 A1 * 5/2007 Pildner ......................... 379/394
2008/0111676 A1 * 5/2008 Dobbs ........................... 340/506
2008/0224848 A1 9/2008 Meyer

OTHER PUBLICATIONS

Author: Robert Auger; Title: Socket Capable Broser Plugin Results In Transparent Proxy Abuse; Publisher: www.thesecuritypractice.com; vol.: 2.00; Pertinent Page: Entire Document.*

* cited by examiner

*Primary Examiner* — Steven Lim
*Assistant Examiner* — Muhammad Adnan
(74) *Attorney, Agent, or Firm* — Husch Blackwell LLP

(57) ABSTRACT

A method and apparatus are provided. The method includes the steps of connecting a rerouting processor to a communication port of an alarm panel, the connected processor capturing an alarm notification sent from the alarm panel through the communication port, said alarm notification including a destination telephone number of a first central monitoring station, the connected processor altering the captured alarm notification by deleting the destination telephone number from the captured alarm notification and the connected processor routing the altered alarm notification to a second central monitoring station that is different than the first monitoring station.

20 Claims, 1 Drawing Sheet

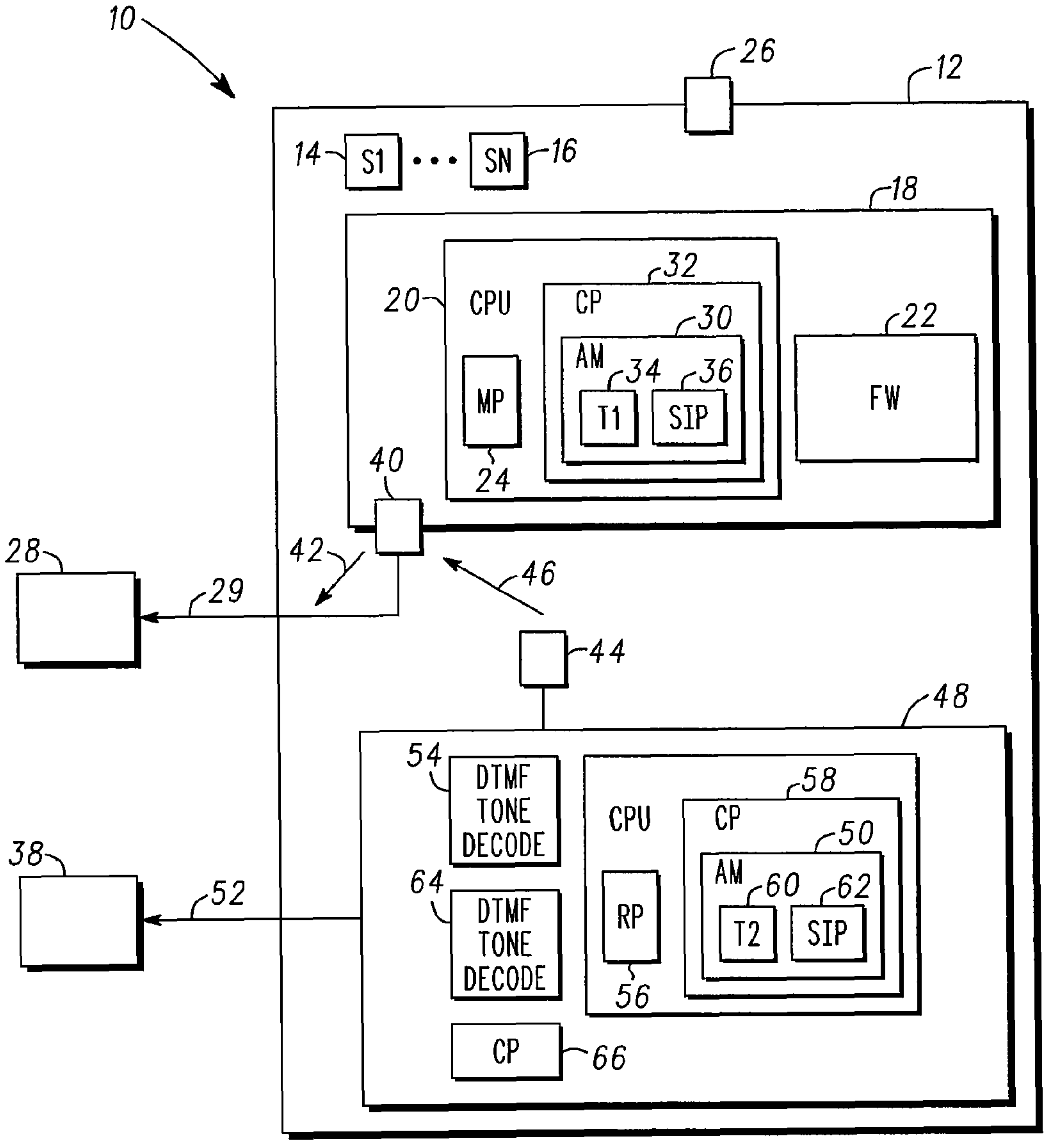
10
26
12
14
S1
SN
16
18
20
CPU
32
CP
30
AM
34
36
T1
SIP
MP
24
22
FW
40
28
42
29
46
44
48
54
DTMF
TONE
DECODE
CPU
58
CP
50
AM
60
62
T2
SIP
RP
56
38
52
64
DTMF
TONE
DECODE
CP
66

ALARM PANEL PHONE NUMBER CAPTURE AND SUBSTITUTION

FIELD OF THE INVENTION

The field of the invention relates to alarm panels and more particularly to alarm panels that operate in conjunction with central monitoring stations.

BACKGROUND OF THE INVENTION

Security systems are generally known. Such systems are typically used in conjunction with a secured area to protect assets and/or people within the secured area.

The secured area is typically protected with a physical barrier (e.g., walls, fences, etc.) extending along a periphery of the secured area. Located along the physical barrier may be one or more access points allowing access into the secured area by authorized persons.

The access points may each include some sort of lock and an intrusion detection device (e.g., a magnetic switch). A control panel is usually provided within the secured area near the access points where an authorized person may enter a code deactivating the system after entry.

The control panel may be located on or coupled to a security panel. The security panel is typically located within the secured area and functions to disarm the security system by matching the identifier entered through the security panel with a reference identifier saved within a computer file.

In the event of a security breach, the security panel generates a local alarm and also sends an alarm notification to a central monitoring station. In many cases, the alarm notification to the central monitoring station is transmitted over a telephone line.

While security systems work well, they are not particularly well adapted for change. In order to operate reliably, the programming of such systems is typically located within firmware of the alarm panel. Because of the need for flexibility, a need exists for better methods of easily modifying the routing of alarms.

BRIEF DESCRIPTION OF THE DRAWINGS

FIG. 1 is a block diagram of a security panel in accordance with an illustrated embodiment of the invention.

DETAILED DESCRIPTION OF AN ILLUSTRATED EMBODIMENT

FIG. 1 is a block diagram of a security system 10 used to protect a secured area 12 shown generally in accordance with an illustrated embodiment of the invention. The security system 10 may include a number of intrusion sensors 14, 16 coupled to an alarm panel 18.

Upon activation of the security system 10, a central processing unit (CPU) 20 loads an operating system, a number of security monitoring applications and a configuration file from memory 22. Included within the security monitoring applications and/or configuration files may be a set of system addresses that allows a monitoring processor 24 to monitor the intrusion sensors 14, 16 and at least one access point 26 that includes a keypad and/or an identification reader (e.g., a keypad, card reader, etc.).

In normal operation, the monitoring processor 24 of the alarm panel 18 continuously monitors the intrusion sensors 14, 16. When an intrusion is detected via activation of one of the sensors 14, 16, the monitoring processor 24 may generate an alarm immediately or wait a predetermined time for entry of an alarm cancel code through the identification reader of the access point 26. If an alarm cancel code is not provided, then the monitoring processor 24 may send an alarm notification message 30 to a central monitoring station 28.

In order to send an alarm notification message 30, the monitoring processor 24 forwards an identifier of the sensor 14, 16 and instructions to a communication processor 32. The communication processor 32 receives the identification of the sensor 14, 16 and composes the alarm notification message 30.

Included within the alarm notification message 30 may be a telephone number 34 of the first central monitoring station 28, a sensor identifier 36, an identifier of the security system 10 and a time. In order to send the message 30, the communication processor 32 may first seize a telephone connection 29 connected to a communication port 40 of the alarm panel 18 and outpulse or otherwise send the telephone number 34. The communication processor 32 may then wait for notification of a connection between the first central station monitoring station 28 and the alarm panel 18.

Once the communication processor 32 of the alarm panel detects the end-to-end connection between the communication processor 32 and the first central monitoring station 28, the communication processor 32 proceeds to send the remainder of the message 30. In this case, the communication processor 32 may use an internal modem to modulate a carrier with the remainder of the message including the identification of the alarm panel 18, the activated sensor 14, 16 and the time. Upon receipt of the alarm message, the first central monitoring station 28 may proceed in a conventional manner by notifying the appropriate entity (e.g., the owner of the secured premises 12, a private security firm, the local police, etc.).

Under an illustrated embodiment of the invention, the security system 10 may be easily modified to operate in conjunction with a second central monitoring station 38 that is different than the first central monitoring station 28. Such a change may become necessary for any of a number of different reasons. For example, the criticality of security within the secured premise may no longer allow the transmission of alarm signals through wires or other communication lines that could be damage or even cut by an intruder before forcibly entering the secured area. Alternatively, an owner of the secured area 12 may wish to obtain central monitoring from a different central monitoring station 38 for purposes of cost or for better service.

Under the illustrated embodiment, the conversion of the system 10 for operation with a different central monitoring station 38 may be accomplished via a rerouting box/processor 48 without modification of the alarm panel 18. In this case, the conventional telephone connection 29 is disconnected 42 from the port 40 of the alarm panel 18. Once the conventional telephone connection 29 is removed from the port 40, a similar connector 44 may be plugged 46 into the port 40, thereby connecting the alarm panel 18 to the rerouting processor 48.

The rerouting processor 48 may operate under any of a number of different formats to route alarm notification messages to the second central monitoring station 38. For example, the rerouting processor 48 may receive the alarm notification message 30 from the alarm panel 18, alter the message 30 by replacing the telephone number 34 of the first central monitoring station 28 with a telephone number of the second central monitoring station 38 and resend the altered message under a conventional format to the second central monitoring station 38 through a wire line connection 52. Alternatively, the rerouting processor 48 may reformat the message for transmission through a local cellular communication link 52 to the second central monitoring station 38. Under still another embodiment, the rerouting processor 48 may reformat the alarm notification message into a packet and send the alarm notification message as a packet to the second central monitoring station 38 through an Internet or Intranet communication channel 52.

The rerouting processor 48 may include a dual tone multi-frequency (DTMF) converter 54 that monitors the communication port 40 of the alarm panel 18. Any messages received through the port 40 are decoded and forwarded to a routing processor 56 for processing.

For example, if the communication processor 32 of the alarm panel 18 were to seize the telephone line of the port 40 and outdial the telephone number 34 of the first central monitoring station 28, then a routing processor 56 would detect the outgoing call and, after an appropriate predetermined time delay send an instruction to the DTMF tone decoder 54 to send a "RINGING" message to the alarm panel 18. After another appropriate predetermined delay, the routing processor 56 sends a "CONNECTED" signal to the alarm panel 18.

Upon receipt of the CONNECTED signal, the alarm panel 18 sends the remainder of the alarm notification message 30. Upon receipt of the reminder of the alarm notification message 30, the routing processor 56 completes processing of the message 30.

For example, from the dialed telephone number T1 34, the routing processor 56 identifies the message as being intended for the first central monitoring station 28. In response, the routing processor 56 alters the content of the message 30 by deleting the dialed telephone number 34 and replaces the dialed telephone number 34 with the telephone number T2 60 of the second central monitoring station 38. The routing processor 56 forwards the content of the altered message 50, including the telephone number T2 60 of the second central monitoring station 38, the identifier of the activated sensor 14, 16, an identifier of the alarm panel 18 and the time to a communication processor 58.

In response, the communication processor 58 composes and sends the altered alarm notification message 50 to the second central monitoring station 38. The composed message 50 may be forwarded to a second DTMF tone decoder 64 that formats and forwards the message 50 to the second central monitoring station 38.

Upon receipt of the alarm notification message 50, the second central monitoring station 38 may respond with an acknowledgement message. The routing processor 56 may receive the acknowledgement message through the DTMF tone decoder 64 and communication processor 58. The communication processor 58 may forward the acknowledgement message to the routing processor 56. The routing processor 56 may replace any source identifier of the second central monitoring station with the source identifier of the first central monitoring station and forward the acknowledgement message to the alarm panel 18.

In addition to exchanging alarm notification messages, the rerouting box/processor 48 may also exchange status messages between the alarm panel 18 and the second central monitoring station 38. As above, the rerouting processor 48 alters the message in each direction to allow the use of the second central monitoring station 38 in place of the first central monitoring station 28.

In another illustrated embodiment, the rerouting box/processor 48 may operate under a cellular format. In this case, the rerouting processor 48 may be provided with a cellular transceiver 66 operating under a GSM/GPRS format through a wireless link 52.

Under the GSM/GPRS format, the communication processor 58 may incorporate the message into a packet. A header of the packet may include a communication system identifier of the second central monitoring station 38. The communication processor 58 may forward the alarm notification message 50 to the cellular transceiver 66. In response, the cellular transceiver 66 may search for and identify a control channel of a local cellular base station.

Once a control channel of a local cellular base station has been identified, the cellular transceiver may send the packet to the cellular base station. The base station may forward the packet to the second central monitoring station 38. The packet may be formatted under any appropriate format (e.g., mail, instant message, etc.).

Under still another illustrated embodiment, the communication link 52 may operate as an Internet or Intranet channel including a local wireless connection between the secured area 12 and a local base station of the cellular network or entirely through the Internet or Intranet channel. As above, transmission through this link 52 may be entirely packet based.

A specific embodiment of method and apparatus for forwarding alarm notification messages in a security system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

Listing of claims:

1. A method comprising:

connecting a rerouting processor to a communication port of an alarm panel;

the connected processor capturing an alarm notification sent from the alarm panel through the communication port, said alarm notification including a destination telephone number of a first central monitoring station;

the connected processor altering the captured alarm notification by deleting the destination telephone number from the captured alarm notification;

the connected processor routing the altered alarm notification to a second central monitoring station that is different than the first monitoring station; and the connected rerouting processor altering messages in each direction between the alarm panel and second monitoring station to allow the use of the second central monitoring station in place of the first central monitoring station including at least replacing any source identifier of the second central monitoring station with a source identifier of the first monitoring station.

2. The method as in claim 1 further comprising the connected processor outdialing a telephone number of the second central monitoring station through a wire line connection.

3. The method as in claim 1 further comprising the connected processor outdialing a telephone number of the second central monitoring station through a cellular telephone connection.

4. The method as in claim 3 wherein the cellular connection further comprises a GSM/GPRS link.

5. The method as in claim 1 further comprising the connected processor detecting an end-to-end connection with the second central monitoring station and sending the altered notification to the second central monitoring station.

6. The method as in claim 1 wherein the step of routing the altered alarm notification further comprises sending the altered message via an Internet or Intranet connection.

7. The method as in claim 6 wherein the altered notification message further comprises an instant message.

8. The method as in claim 1 further comprising the processor sending an acknowledgement message to the alarm panel including at least an identifier of the first central monitoring station.

9. A apparatus comprising:
- an alarm panel;
- a communication port disposed on the alarm panel;
- an alarm notification sent from the alarm panel through the communication port, said alarm notification including a destination telephone number of a first central monitoring station; and
- a routing processor that captures the alarm notification message from the communication port, that alters the captured alarm notification by deleting the destination telephone number from the captured alarm notification and that routes the altered alarm notification to a second central monitoring station that is different than the first monitoring station, wherein the routing processor alters messages in each direction between the alarm panel and second monitoring station to allow the use of the second central monitoring station in place of the first central monitoring station.

10. The apparatus as in claim 9 further comprising an outdialed telephone number of the second central monitoring station sent through a wire line connection.

11. The apparatus as in claim 9 further comprising a cellular transceiver that outdials a telephone number of the second central monitoring station through a cellular telephone connection.

12. The apparatus as in claim 11 wherein the cellular connection further comprises a GSM/GPRS link.

13. The apparatus as in claim 9 further comprising an end-to-end connection detected between the second central monitoring station and the routing processor through which the altered notification is sent to the second central monitoring station.

14. The apparatus as in claim 9 further comprising an Internet or Intranet connection through which the altered message is sent to the second central monitoring station.

15. The apparatus as in claim 14 wherein the altered alarm notification message further comprises an instant message.

16. The method as in claim 9 further comprising the processor sending an acknowledgement message to the alarm panel including at least an identifier of the first central monitoring station.

17. An apparatus comprising:
- a rerouting processor coupled to a communication port of an alarm panel;
- means within the rerouting processor for capturing an alarm notification sent from the alarm panel through the communication port, said alarm notification including a destination telephone number of a first central monitoring station;
- means within the rerouting processor for altering the captured alarm notification by deleting the destination telephone number from the captured alarm notification; and
- means within the rerouting processor for routing the altered alarm notification to a second central monitoring station that is different than the first monitoring station; and
- the rerouting processor alters messages in each direction between the alarm panel and second monitoring station to allow the use of the second central monitoring station in place of the first central monitoring station.

18. The apparatus as in claim 17 further comprising means within the rerouting processor for outdialing a telephone number of the second central monitoring station through a wire line connection.

19. The apparatus as in claim 17 further comprising means within the rerouting processor for outdialing a telephone number of the second central monitoring station through a cellular telephone connection.

20. The apparatus as in claim 19 wherein the cellular connection further comprises a GSM/GPRS link.

* * * * *